(12) United States Patent
Ferguson

(10) Patent No.: US 7,860,972 B2
(45) Date of Patent: Dec. 28, 2010

(54) DUPLICATE MOBILE DEVICE PIN DETECTION AND ELIMINATION

(75) Inventor: Tabitha K. Ferguson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1514 days.

(21) Appl. No.: 10/079,319

(22) Filed: Feb. 20, 2002

(65) Prior Publication Data

US 2002/0120860 A1 Aug. 29, 2002

Related U.S. Application Data

(60) Provisional application No. 60/269,809, filed on Feb. 20, 2001.

(51) Int. Cl.
*G06F 15/16* (2006.01)
(52) U.S. Cl. ...................................... 709/226; 455/419
(58) Field of Classification Search ................. 709/223, 709/224, 227, 228, 226; 455/412.1, 419
See application file for complete search history.

(56) References Cited

U.S. PATENT DOCUMENTS

| | | | | |
|---|---|---|---|---|
| 5,410,543 | A * | 4/1995 | Seitz et al. ................... | 370/463 |
| 5,550,576 | A * | 8/1996 | Klosterman ................... | 725/46 |
| 5,634,051 | A | 5/1997 | Thomson | |
| 5,655,004 | A * | 8/1997 | Holbrook ..................... | 455/411 |
| 5,787,019 | A * | 7/1998 | Knight et al. ................ | 719/324 |
| 5,832,304 | A * | 11/1998 | Bauman et al. ................ | 710/40 |
| 5,991,828 | A * | 11/1999 | Horie et al. ..................... | 710/8 |
| 6,026,165 | A * | 2/2000 | Marino et al. ................ | 380/273 |
| 6,069,877 | A | 5/2000 | Yang | |
| 6,073,016 | A * | 6/2000 | Hulthen et al. ........... | 455/435.2 |
| 6,298,047 | B1 * | 10/2001 | Steffes et al. ................ | 370/310 |
| 6,345,319 | B2 * | 2/2002 | Lin et al. ....................... | 710/8 |
| 6,366,777 | B1 * | 4/2002 | Uusitalo ....................... | 455/433 |
| 6,453,162 | B1 * | 9/2002 | Gentry ......................... | 455/433 |
| 6,463,154 | B1 * | 10/2002 | Patel ............................ | 380/270 |
| 6,463,463 | B1 * | 10/2002 | Godfrey et al. ............. | 709/206 |
| 6,490,445 | B1 * | 12/2002 | Holmes ....................... | 455/419 |

(Continued)

FOREIGN PATENT DOCUMENTS

EP 0 982 963 A2 3/2000

(Continued)

OTHER PUBLICATIONS

RA User Base Utils & Doors; (http://archives.thebbs.org/ra57c.htm); pp. 1-37.*

(Continued)

*Primary Examiner*—Patrice L Winder
(74) *Attorney, Agent, or Firm*—Jones Day; Krishna K. Pathiyal; Robert C. Liang

(57) ABSTRACT

A method and system for detecting and eliminating duplicate wireless mobile communications device Personal Identification Numbers (PINs) stored in user administration records associated with a server system is disclosed. The PIN of a wireless mobile communications device stored in a user administration record is checked against other existing user administration records, and if a duplicate of the PIN is detected, the PIN in one of the user administration records is reset. Duplicate PIN detection and elimination operations are preferably performed each time a new user administration record is created but may possibly be performed in response to selection of a particular user account, PIN or user administration record.

13 Claims, 4 Drawing Sheets

U.S. PATENT DOCUMENTS

| | | | |
|---|---|---|---|
| 6,687,743 B1 * | 2/2004 | Innes | 709/206 |
| 6,738,808 B1 * | 5/2004 | Zellner et al. | 709/223 |
| 6,763,454 B2 * | 7/2004 | Wilson et al. | 713/1 |
| 6,829,467 B2 * | 12/2004 | Ochiai | 455/41.2 |
| 6,934,532 B2 * | 8/2005 | Coppinger et al. | 455/412.1 |
| 7,003,571 B1 * | 2/2006 | Zombek et al. | 709/227 |
| 7,069,319 B2 * | 6/2006 | Zellner et al. | 709/224 |
| 7,219,124 B2 * | 5/2007 | Cerami et al. | 709/203 |
| 7,512,692 B2 * | 3/2009 | Minborg et al. | 709/227 |
| 2002/0085579 A1 * | 7/2002 | Sullivan et al. | 370/428 |
| 2002/0099806 A1 * | 7/2002 | Balsamo et al. | 709/223 |
| 2005/0228795 A1 * | 10/2005 | Shuster | 707/10 |
| 2005/0240428 A1 * | 10/2005 | Gabrick et al. | 705/1 |

FOREIGN PATENT DOCUMENTS

| | | | |
|---|---|---|---|
| JP | 08204756 A | * | 8/1996 |

OTHER PUBLICATIONS

Translation of Japanese Patent Application (Iwamoto) No. 8-204756 published Aug. 9, 1996.

* cited by examiner

DUPLICATE MOBILE DEVICE PIN DETECTION AND ELIMINATION

REFERENCE TO RELATED APPLICATION

This application claims priority from U.S. Provisional Application Ser. No. 60/269,809, filed on Feb. 20, 2001. The complete disclosure of this provisional application, including drawings and claims, is hereby incorporated into this application by reference.

BACKGROUND OF THE INVENTION

1. Field of the Invention

This invention relates to user administration in a mobile communication system, and in particular to reconciling duplicate Personal Identification Number (PIN) registrations, i.e. the same device PIN being used by more than one user.

2. Description of the Prior Art

Personal Identification Numbers (PINs) are used to identify a wireless mobile communications device within a communication network, hereinafter referred to primarily as a "mobile device". The registration of the mobile device in the communication network effectively associates the particular mobile device with a particular user messaging account.

In prior art communication systems, two user accounts with the same PIN could potentially be created within the same system. This could happen, for example, when a new user takes over a mobile device previously used by another user. When the mobile device PIN is associated with an account for the new user, but also remains associated with the previous user's account, this results in communications for the two different user accounts, such as host system mailboxes for example, being sent to a single mobile device, and vice versa. In a messaging system, network resources are therefore expended to deliver messages intended for one user's account to a different user's mobile device. For the intended recipient, this represents a substantial security issue, since another user may be receiving his or her messages. Furthermore, for the mobile device user, increased message traffic due to messages for the other user account consumes mobile device power and resources, thus shortening battery life, and may also increase airtime costs.

When operating within a secure system, a mobile device and a host system which communicates with the mobile device sometimes use corresponding encryption keys in order for decryption of secure communications to occur successfully. Therefore, in the above example of a mobile device PIN being associated with two user accounts, associated although messages for both user accounts would be sent to the mobile device, messages for only one of the user accounts could be successfully decrypted at the mobile device. Since over-the-air protocols do not typically identify a user or user account, a host system would be unable to determine, using the device PIN, which user's account should be associated with the PIN. If the wrong account is chosen, then the associated encryption key will be used to encrypt a message, and attempts to decrypt messages at the mobile device would fail. Similarly, incoming message from a mobile device whose PIN has been associated with more than one user account might not be properly decrypted at a host system when an incorrect one of the user accounts is chosen.

Therefore, there remains a need for a system and method for detecting duplicate mobile device PIN assignments and reconciling such conflicting mobile device registrations.

SUMMARY OF THE INVENTION

It is an object of the invention to detect and eliminate duplicate mobile device PINs from user administration records.

A related object of the invention is to provide for detection and elimination of duplicate mobile device PINs from existing administration information when a new user or user account is added to a communication network.

In one aspect of the invention, a method for detecting and eliminating duplicate wireless mobile communications device PINs stored in user administration records associated with a server system comprises the steps of checking the PIN of a wireless mobile communications device stored in a user administration record against other existing user administration records, and if a duplicate of the PIN is detected in one of the other existing user administration records, then resetting the PIN in either the user administration record or the one of the other existing user administration records.

According to a related aspect of the invention, a system for detecting and eliminating duplicate wireless mobile communications device PINs in a communication system comprises a data store configured to store user administration records, each user administration record being adapted to include a PIN, and a server system configured to detect whether or not a PIN stored in a user administration record in the data store occurs in any other user administration record in the data store, and if so, to reset the PIN in either the user administration record or the other user administration record.

Further features of the invention will be described or will become apparent in the course of the following detailed description.

BRIEF DESCRIPTION OF THE DRAWINGS

In order that the invention may be more clearly understood, the one or more embodiments thereof will now be described in detail by way of example, with reference to the accompanying drawings, in which.

DETAILED DESCRIPTION OF PREFERRED EMBODIMENTS

As used in this description and the appended claims, a PIN refers to an identifier for a particular mobile device. It will be apparent to those skilled in the art to which the present invention pertains that different mobile devices and communications networks use different types of mobile device identifiers, including not only numbers but also combinations of numbers, letters and other characters. Therefore, the term "PIN" should be interpreted to include numeric as well as other types of mobile device identifiers.

Figure 1:
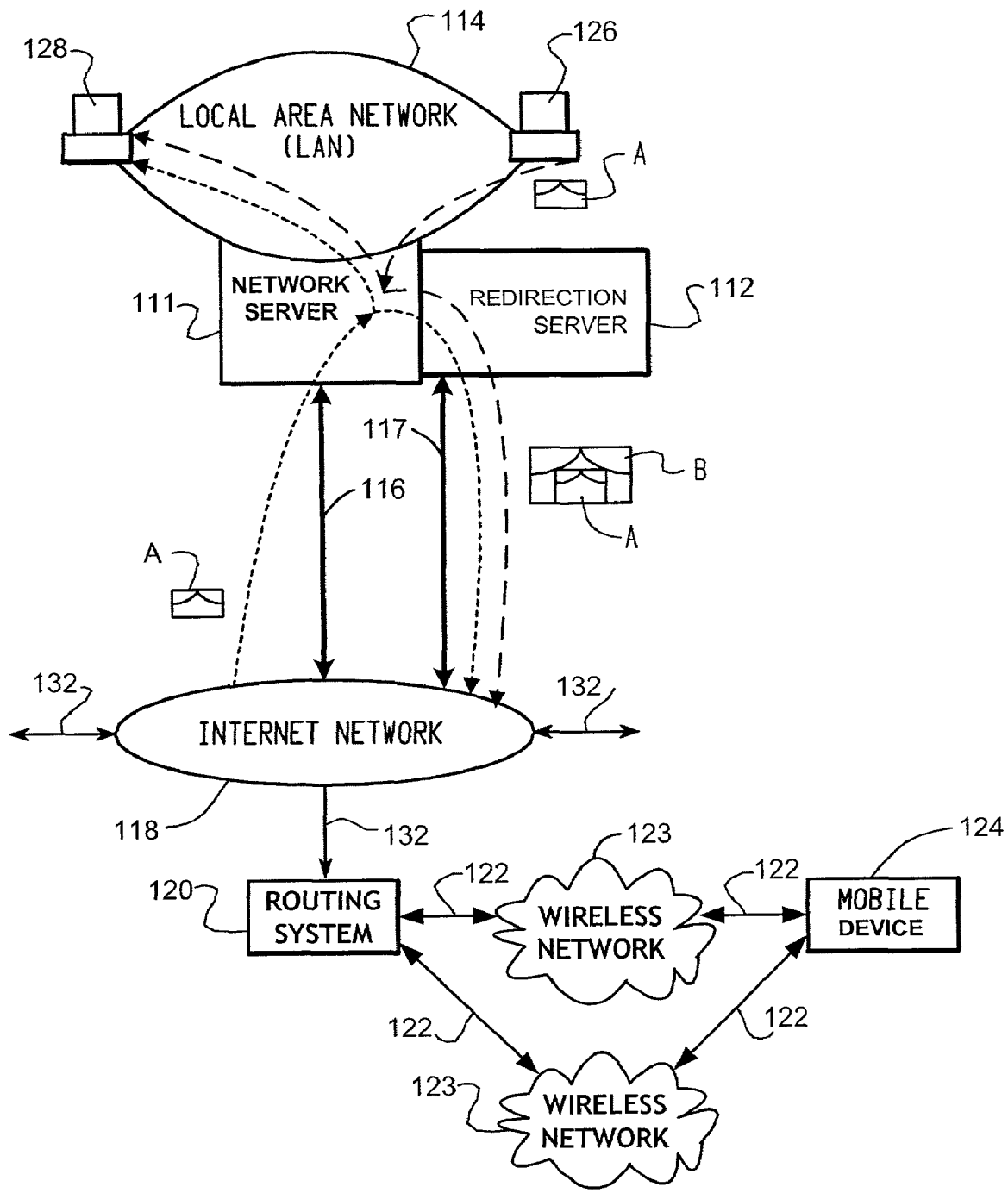
FIG. 1 is a block diagram of a communication system in which the invention may be implemented.

A typical system in which the invention may be implemented is shown generally in FIG. 1, in which user workstations 126 and 128 operate within a local area network (LAN)

114 controlled by a server computer 111. A component 112, shown as a redirection server 112, may be implemented for example as software installed and running on the server computer 111 or may instead possibly be a separate server computer operatively associated with the server computer 111. The redirection server 112 enables data items, such as email messages, calendar appointments, meeting reminders and the like, to be forwarded from the LAN 114 to a mobile device 124. Such data items are sent through a wide area network (WAN) 118 such as the Internet, via a preferably high-bandwidth connection 117, to a routing system 120. The routing system 120 then forwards the data items through links 122 and one of a plurality of wireless networks 123 within which the mobile device 124 is adapted to operate. The mobile device 124 may for example be a mobile data communications device, a mobile voice communications device, a dual-mode communications device having both voice and data communications capabilities, a wireless mobile messaging client, a cellular telephone, a personal digital assistant (PDA) enabled for communications, a wireless modem, a one-way pager or a two-way pager.

Those skilled in the art will appreciate that a communications system may include many more components than those shown in FIG. 1. For example, although the network server 111 and redirection server 112 are shown as having direct connections 116, 117 to the WAN 118, it should be apparent that one or both of these connections may be indirect, possibly through further networks and computer systems which have not been shown in FIG. 1 to avoid congestion in the drawing. It is also contemplated that connections 116, 117 may be implemented as a single shared connection which provides both the network server 111 and the redirection server 112 with access to the WAN 118.

Operation of the system shown in FIG. 1 will now be described in further detail. For example, an email message A destined for a user account on the network server 111, originating at either a workstation such as 126 within the LAN 114 or arriving at the LAN 114 via its connection 116 to the WAN 118, may be both received by the network server 111 and redirected by the redirection server 112 to a mobile device 124 associated with the user account. As shown in FIG. 1, once the message A has been received by the network server 111, it may be accessed using a network workstation such as 128. Redirection of the message A allows an owner of a user account to also receive the message A at a mobile device 124.

The redirection server 112 preferably compresses and possibly encrypts the message A, repackages the compressed and possibly encrypted message A in an outer envelope B, and sends the repackaged message, A in B, to the mobile device 124. The outer envelope B provides all the routing information required to deliver the message through the WAN 118, routing system 120, links 122 and a wireless network 123 to the mobile device 124. The mobile device 124 then removes the outer envelope B and decrypts (if necessary) and decompresses the message A. Further details of redirection operations are described for example in U.S. Pat. No. 6,219,694, granted on Apr. 17, 2001 and titled "System and Method for Pushing Information from a Host System to a Mobile Data Communication Device Having a Shared Electronic Address", the disclosure of which is hereby incorporated into this description by reference. Where the message is encrypted by the redirection server 112, message decryption problems may occur at the mobile device 124, as described above.

In order for such message redirection to occur, a mobile device and user account, such as an email account or mailbox for example, within the LAN 114 must be registered with the redirection server 112. This registration is a server administration function that is normally, although not necessarily, performed in two steps, by first adding a new user record at a storage location accessible by the redirection server 112 and then assigning a particular mobile device for the user by adding the mobile device PIN to the user record. Preferably, after a user record has been created, a mobile device user connects the mobile device to a workstation, such as the workstation 128 in the above example, associated with the user account to be enabled for redirection to the mobile device 124 to complete the registration process.

Embodiments of the invention will now be described in reference to FIGS. 2-4. Although reference is also made to the system of FIG. 1, the invention is in no way restricted to implementation in that system. The system of FIG. 1 is intended for illustrative purposes only.

Figure 2:
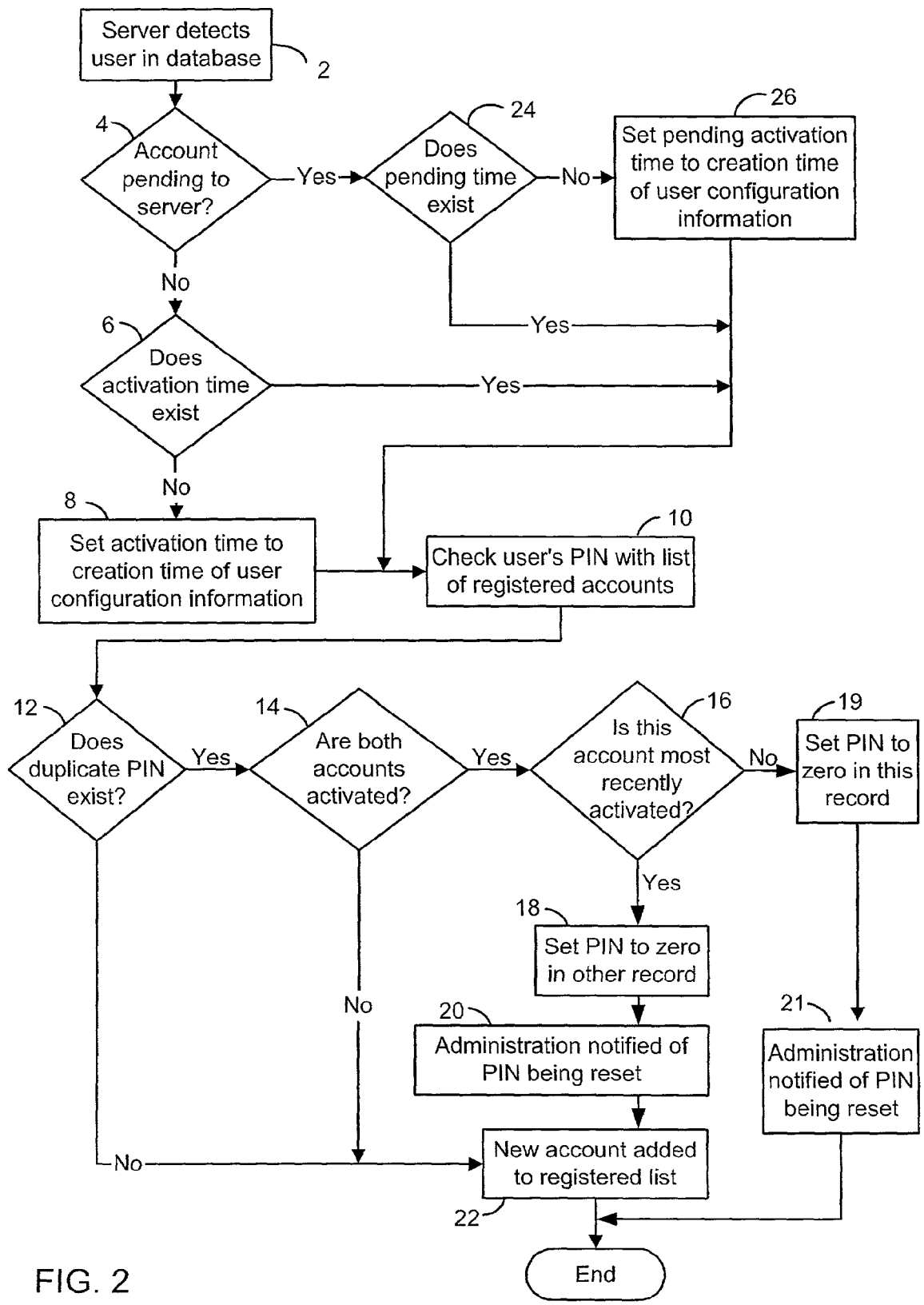
FIG. 2 is flow diagram showing an overview of a method to eliminate duplicate mobile device PINs.

FIG. 2 illustrates a method for detecting and eliminating a duplicate mobile device PIN when a new user account and mobile device are registered in a communication system or when a mobile device is first registered for an existing user account. In step 2, a server with which a user account and mobile device must be registered reads the user's configuration information. In the illustrative example system of FIG. 1, this server is the redirection server 112. The configuration information, which is normally stored in a new administration record created on the server or on a data store accessible by the server when the user account is registered with the server, represents the user account on the server and includes the PIN of the mobile device to which messages addressed to the user account are to be redirected. In step 4, the server checks whether a user account is pending to the server. A user account is pending to the server when a corresponding new administration record has been added to the server, but the user has not yet connected the mobile device to a host system or network workstation to download required routing information and possibly one or more encryption keys to be used by the mobile device for communication within a system such as shown in FIG. 1.

If the user account is not pending to the server, then the process continues at step 6, in which the server determines whether or not an activation time exists for the user account. If an activation time does not exist, then in step 8, the server sets the activation time for the user account to the time of the creation of the user's configuration information in the new record. This may be the time at which the user account was first registered with the server, or possibly a later time at which particular settings or information were specified, such as a new mobile device PIN. In step 10, the server checks the PIN of the mobile device associated with the user account against the existing user records for all other user accounts currently registered on the server. The server preferably maintains a list of PINs for existing registered user accounts to facilitate the checking function at step 10. Using such a list, only the list, not entire user records, must be accessed to check for the new PIN.

In step 12, the server determines whether or not a duplicate of the mobile device PIN has been stored in an existing user record or a list of registered mobile device PINs. If a duplicate of that PIN exists, then in step 14, the server determines if both of the user accounts are currently activated, i.e. if both user accounts have been registered on the server and have connected a mobile device to download the required routing information. In step 16, the server determines which user account was most recently activated on the server and allows the most recently activated user account to keep the PIN by setting the PIN in the administration record associated with the older user account to zero, or alternatively to some other default or null value, in step 18. In step 20, the server notifies its associated administration arrangement or sub-system that the PIN in the older record has been reset. In step 22, the server adds the new user account to the registered user account list.

When the new user account is not the most recently activated user account, resulting in a negative determination at step 16, then the mobile device PIN in the record for the new user account is set to zero or a default or null value at step 19. Then, at step 21, server administration is notified that the mobile device PIN in the administration record for the new account has been reset. Since a PIN is typically programmed into a memory on a mobile device by a manufacturer, a redirection or other communication service provider or possibly a server administrator, a user may then either obtain a new mobile device or have a different PIN programmed into the mobile device in order to register an account and mobile device with the server.

If the user account is pending to the server, as determined at step 4, then in step 24, the server determines whether a pending time exists. In step 26, if no pending time exists for the user, the server sets a pending activation time to the time when the configuration information for the user account was created. When a user connects the device to a host system as described above, the activation time will be set to the pending activation time.

Figure 3:
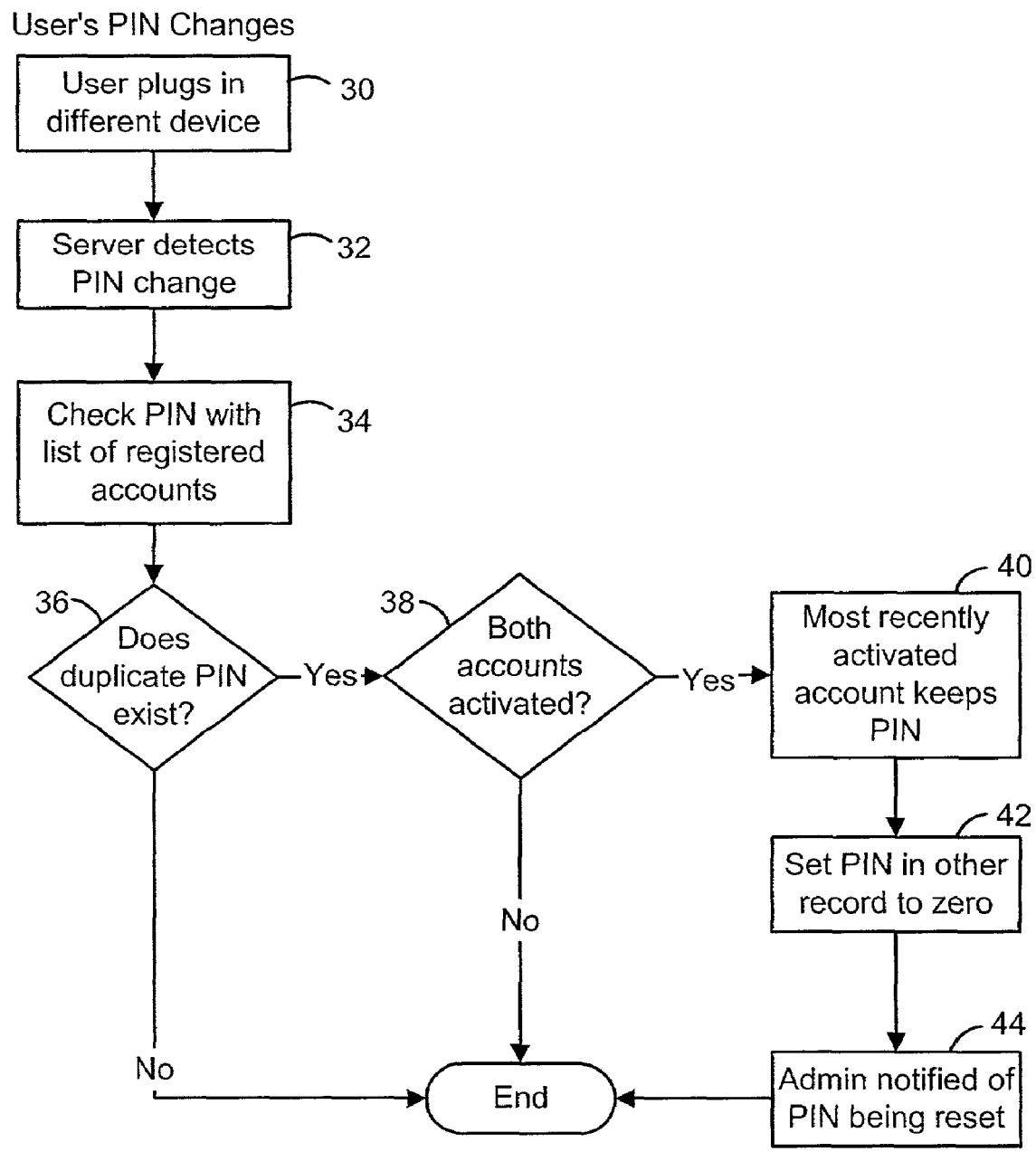
FIG. 3 is a flow diagram depicting a method used when a user's mobile device PIN is changed.
Figure 4:
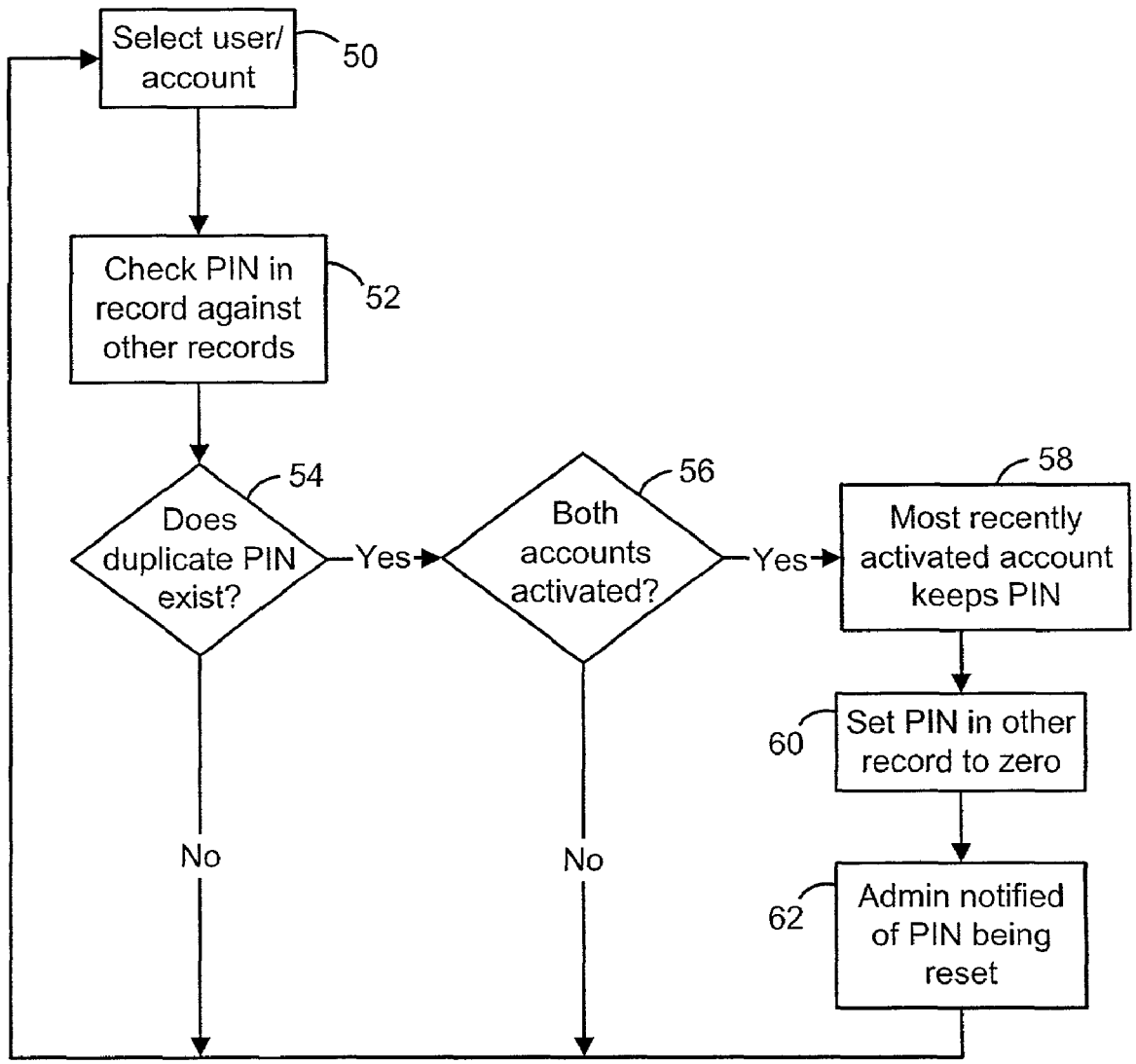
FIG. 4 is a flow diagram depicting a method used to rescan a user's mobile device PIN.

FIG. 3 shows a similar duplicate PIN detection and elimination method used when the PIN in a user's administration record is changed. In step 30, the user connects a different mobile device to a host system, such as workstation 128 in FIG. 1. In step 32, the server detects the different PIN for the different mobile device by accessing an existing record for the registered user account. In step 34, the server checks the PIN of the different mobile device against the list of user accounts currently registered on the server. In step 36, the server determines whether or not a duplicate of the PIN exists. If a duplicate PIN does not exist, then the method ends. In step 38, if the server determines that a duplicate PIN exists, the server determines whether both user accounts with the duplicate PIN have been activated. In step 40, if both accounts have been activated, the server allows the most recently activated account to retain the PIN. In step 42, the server sets the PIN in the record associated with the older user account to zero or another predetermined null value. In step 44, the server notifies administration that the PIN has been reset. The method then ends.

In some circumstances or at certain times, network owners or operators may wish to verify that the same mobile device PIN has not been assigned to different user accounts. Such a verification or "rescan" method is shown in FIG. 4. At step 50, the server retrieves information for a user account, such as an administration record for a particular specified user for example, from a database or list of activated user accounts which may be stored at the server or a data store accessible to the server. In step 52, the server checks the mobile device PIN against the list of user accounts, records or PINs that are currently registered. In step 54, the server determines if a duplicate PIN exists. If so, then in step 56, the server determines whether or not both user accounts with the duplicate PIN are currently activated. In step 58, if both accounts have been activated, the server allows the most recently activated user account to keep the PIN. In step 60, the server sets the PIN in a record associated with the other account to a null value such as zero. In step 62, the server notifies its administration system that the PIN has been reset. If desired, an owner of a user account could be notified of a PIN reset by some means, although typically a previous user would have stopped using a mobile device or is using a new mobile device with a new PIN and therefore has no need of that particular PIN any more.

It will be appreciated that the above description relates to preferred embodiments by way of example only. Many variations on the invention will be obvious to those knowledgeable in the field, and such obvious variations are within the scope of the invention as described and claimed, whether or not expressly described.

For example, although the invention has been described primarily in the context of a messaging system, it is no way restricted thereto. Detection and elimination of duplicate mobile device PINs in accordance with aspects of the invention may also be implemented in other mobile communication systems such as cellular telephone networks and the like.

It should be appreciated that instead of resetting the PIN in a older user administration record, an alternative which might be desirable in certain organizations or under certain conditions would be to reset a PIN in a new user record or when the PIN is added to an existing administration record. The new user would then be forced to either obtain a new mobile device or contact a server administrator, mobile device manufacturer or service provider for assignment of a new PIN to the mobile device, as described briefly above. The frequency of such administrator action being required is likely to be significantly higher in most organizations, however, than when the PIN in an older record is reset. Nevertheless, the invention contemplates that either PIN could be reset, as desired.

The invention also contemplates that from time to time, a "master" scan could be conducted, to check across the system for duplicate PINs assigned to different user accounts. However, such a master scan should only be needed once, if at all, i.e. at the time of implementing a duplicate PIN detection and elimination scheme according to aspects of this invention, since thereafter any duplicate PINs would be detected as they occur.

The invention claimed is:

1. A computer-implemented method for detecting and eliminating duplicate wireless mobile communications device identifiers stored in user administration records associated with a server system, each of the user administration records including a wireless mobile communications device activation time, the method comprising the steps of:

receiving, at the server, information for registering a user account for a wireless mobile communications device; and while the user account is pending to the server, wherein the user account is pending to the server when a corresponding user administration record has been added to the server but the wireless communication device has not been connected to a host system or network workstation to download required routing information, performing the steps of:

checking the identifier of the wireless mobile communications device stored in the user administration record against other existing user administration records to detect duplicate identifiers associated with different account holders; and if a duplicate of the identifier is detected in one of the other existing user administration records, then comparing the activation time in the user administration record with the activation time in the one of the other existing user administration records, and resetting the identifier in the user administration record or the one of the other existing user administration records based on a result of the comparison of the activation times.

2. A method as recited in claim 1, wherein the step of resetting the identifier comprises resetting the identifier of the one of the other existing user administration records to a null value.

3. A method as recited in claim 1, wherein:
the server system maintains a separate list of identifiers for existing user records; and
the step of checking the identifier against other existing user administration records comprises checking the identifier against the list.

4. A method as recited in claim 1, wherein the step of resetting the identifier based on a result of the step of comparing comprises resetting the identifier in the user record having an earlier activation time.

5. The method of claim 1, further comprising assigning a new identifier to a device associated with the identifier that is reset.

6. A system for detecting and eliminating duplicate wireless mobile communications device identifiers in a communication system, comprising:
a data store configured to store user administration records, each user administration record being adapted to include a identifier and each of the user administration records including a wireless mobile communications device activation time; and
a server system configured to:
receive information for registering a user account for a wireless mobile communications device, and
while the user account is pending to the server, detect whether or not a identifier stored in the user administration record in the data store occurs in any other user administration record in the data store for a different account holder, and if so, to compare the activation time in the user administration record with the activation time in the one of the other user administration records, and reset the identifier in the user administration record or the one of the other user administration records based on a result of the comparison of the activation times, wherein the user account is pending to the server when a corresponding user administration record has been added to the server but the wireless communication device has not been connected to a host system or network workstation to download required routing information.

7. A system as recited in claim 6, wherein the server system resets a identifier by storing a null value to the user administration record.

8. A system as recited in claim 7, wherein the server system provides a message redirection service and is further configured to redirect messages from a host system to wireless mobile communication devices.

9. A system as recited in claim 6, wherein the wireless mobile communications device is selected from the group consisting of: a mobile data communications device, a mobile voice communications device, a dual-mode communications device having both voice and data communications capabilities, a wireless mobile messaging client, a cellular telephone, a personal digital assistant (PDA) enabled for communications, a wireless modem, a one-way pager and a two-way pager.

10. The system of claim 6, further comprising a new identifier assigned to a device associated with the identifier that is reset.

11. A computer implemented method for detecting and eliminating duplicate wireless mobile communications device Personal Identification Numbers (PINs) stored in user administration records associated with a server system, each of the user administration records including a wireless mobile communications device activation time, the method comprising the steps of:
receiving configuration information for a new user account, the configuration information including a new user PIN;
determining whether the user account is pending to the server, wherein the user account is pending to the server when a corresponding new user administration record has been added to the server, but the new user has not yet connected the wireless mobile communications device to a host system or network workstation to download required routing information;
checking the new user PIN with a list of registered user accounts;
determining whether a duplicate PIN exists for an existing user account while the new user account is pending to the server, and if so, whether both user accounts are activated;
if no duplicate PIN exists or if both new and existing user accounts are not activated, then adding the new user account to the registered list;
if the duplicate PIN for the existing user account exists and both new user and existing user accounts are activated, then determining the most recently activated user account, and setting the PIN of the user account that is not the most recently activated to zero and notifying an administrator of the setting of the PIN to zero.

12. The method of claim 11, further comprising the steps of:
if the new user account is not pending to the server, then determining whether an activation time exists for the new user account;
if the activation time does not exist, then the setting the activation time for the new user account to the time of creation of the new user account configuration information.

13. The method of claim 12, further comprising the steps of:
if the new user account is pending to the server, then determining if a pending time exists;
if a pending time does not exist then setting the pending activation time for the new user account to the time of creation of the new user account configuration information.

* * * * *